(12) United States Patent
Kang et al.

(10) Patent No.: US 8,528,011 B2
(45) Date of Patent: Sep. 3, 2013

(54) TURNTABLE FOR MOTOR WITH DISK HOLDING PART HAVING PARTICLES AND METHOD FOR PRODUCING THE SAME

(75) Inventors: Dae Lyun Kang, Gyunggi-do (KR); Dong Yeon Shin, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 39 days.

(21) Appl. No.: 13/067,792

(22) Filed: Jun. 27, 2011

(65) Prior Publication Data

US 2012/0005698 A1   Jan. 5, 2012

(30) Foreign Application Priority Data

Jun. 30, 2010   (KR) .................. 10-2010-0063079

(51) Int. Cl.
*G11B 17/03*   (2006.01)

(52) U.S. Cl.
USPC ............................................. 720/707

(58) Field of Classification Search
USPC .......................... 720/703, 707, 715
See application file for complete search history.

(56) References Cited

U.S. PATENT DOCUMENTS

| | | | |
|---|---|---|---|
| 7,493,633 B2 * | 2/2009 | Ikemoto ................... | 720/707 |
| 7,849,474 B2 * | 12/2010 | Kuramoto et al. ......... | 720/707 |
| 2008/0307448 A1 | 12/2008 | Fukagawa et al. | |
| 2010/0077415 A1 * | 3/2010 | Yoo et al. ................ | 720/605 |

FOREIGN PATENT DOCUMENTS

| | | |
|---|---|---|
| JP | 6-75163 | 10/1994 |
| JP | 6-84560 | 12/1994 |
| JP | 11-245378 | 9/1999 |
| JP | 11-260037 | 9/1999 |
| JP | 11-356023 | 12/1999 |
| JP | 2002-197762 | 7/2002 |
| JP | 2003-9482 | 1/2003 |
| JP | 2004-110919 | 4/2004 |
| JP | 2004-156178 | 6/2004 |
| KR | 1997-0063133 | 9/1997 |

OTHER PUBLICATIONS

Japanese Office Action issued Sep. 25, 2012 in corresponding Japanese Patent Application No. 2011-118395.
Korean Office Action issued Jun. 27, 2011 in corresponding Korean Patent Application 10-2010-0063079.
Japanese Office Action issued Apr. 9, 2013 in corresponding Japanese Patent Application No. 2011-118395.

* cited by examiner

*Primary Examiner* — Angel Castro

(57) ABSTRACT

There is provided a turntable for a motor, including: a rotor case equipped with a chucking mechanism mounting a disk; a disk holding base part formed on the rotor case to be protruded by denting and disposed to be spaced apart from each other in order to form an air passage communicating a space formed between the disk and the top surface of the rotor case with the outer side of the rotor case; and a disk holding friction part stacked on the disk holding base part and grounded to the bottom surface of the disk.

2 Claims, 4 Drawing Sheets

TURNTABLE FOR MOTOR WITH DISK HOLDING PART HAVING PARTICLES AND METHOD FOR PRODUCING THE SAME

CROSS-REFERENCE TO RELATED APPLICATIONS

This application claims the priority of Korean Patent Application No. 10-2010-0063079 filed on Jun. 30, 2010, in the Korean Intellectual Property Office, the disclosure of which is incorporated herein by reference.

BACKGROUND OF THE INVENTION

1. Field of the Invention

The present invention relates to a turntable for a motor and a method for producing the same, and more particularly, to a turntable for a motor included in a motor provided in a disk driving apparatus and a method for producing the same.

2. Description of the Related Art

Generally, a spindle motor equipped in an optical disk drive serves to rotate a disk so that an optical pickup mechanism can read data recorded on the disk.

In addition, the spindle motor may be configured to include a rotor case mounted on a shaft rotatably supported to a sleeve and a disk support member contacting a bottom surface of a disk at the time of mounting the disk on the top surface of the rotor case to support the disk.

Meanwhile, when the disk is rotatably mounted on the spindle motor, a pressure difference is generated between a central region of the disk and an edge region of the disk. In addition, the lower portion of the rotor case may be disposed with various heat sinks and the temperature difference between the central region of the disk and the edge region of the disk is generated.

Vibrations may be generated at the time of rotatably driving the disk by the pressure difference and the temperature difference, thereby causing the problem in that the power consumption of the motor is increased.

In addition, the time required to stabilize the motor during the driving thereof, and the time required to rotate the motor at high speed are increased due to the generation of vibrations, such that the temperature of internal components is increased, thereby degrading durability. Further, there is a problem in that noise is increased due to the generated vibrations.

Meanwhile, the disk support member is generally formed by bonding a rubber or a silicon sheet to the top surface of the rotor case. In this case, force is applied to an end of the rubber or the silicon sheet during a process of mounting or detaching the disk on or from an optical disk drive, or foreign objects collide with the end of the rubber or silicon sheet, thereby causing a problem in that the sheet may be lifted and peeled.

SUMMARY OF THE INVENTION

An aspect of the present invention provides a turntable for a motor capable of preventing a disk holding friction part supporting a bottom surface of a disk and providing friction force from being lifted and peeled.

Further, another aspect of the present invention provides a method for producing a turntable for a motor with improved workability capable of easily forming a disk holding friction part.

According to an aspect of the present invention, there is provided a turntable for a motor, including: a rotor case equipped with a chucking mechanism mounting a disk; a disk holding base part formed on the rotor case to be protruded by denting and disposed to be spaced apart from each other in order to form an air passage communicating a space formed between the disk and the top surface of the rotor case with the outer side of the rotor case; and a disk holding friction part stacked on the disk holding base part and grounded to the bottom surface of the disk.

The rotor case may be made of a metal material to be molded by press machining.

The disk holding friction part may be made of a mixture of at least one of rubber particles or silicon particles and an adhesive and is applied to the disk holding base part and is stacked thereon.

According to another aspect of the present invention, there is provided a method for producing a turntable for a motor, including: forming a disk holding base part to be protruded from a top surface of a rotor case by press machining; and forming a disk holding friction part by applying a mixture of at least one of rubber particles or silicon particles and an adhesive to the disk holding base part.

The forming of the disk holding friction part may include: dropping a mixture of at least one of rubber particles or silicon particles and an adhesive on the top surface of the disk holding base part; applying the mixture positioned the top surface of the disk holding base part to the top surface of the disk holding base part through an application roller; and hardening the mixture applied to the disk holding base part.

The forming of the disk holding friction part may include: dipping the application roller in the mixture of at least one of the rubber particles or the silicon particles and the adhesive, applying the mixture on the upper surface of the disk holding base part, and hardening the mixture applied to the disk holding base part.

The mixture is hardened by heat or ultraviolet rays.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, and those are to be construed as being included in the spirit of the present invention.

Further, when it is determined that the detailed description of the known art related to the present invention may obscure the gist of the present invention, the detailed description thereof will be omitted.

Figure 1:
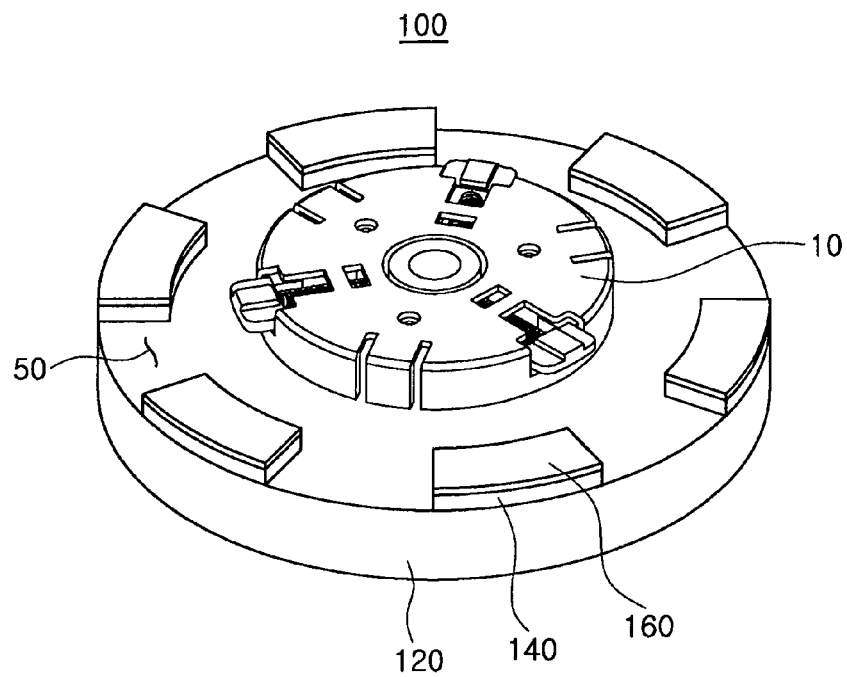
FIG. 1 is a perspective view showing a turntable for a motor according to an exemplary embodiment of the present invention.
Figure 2:
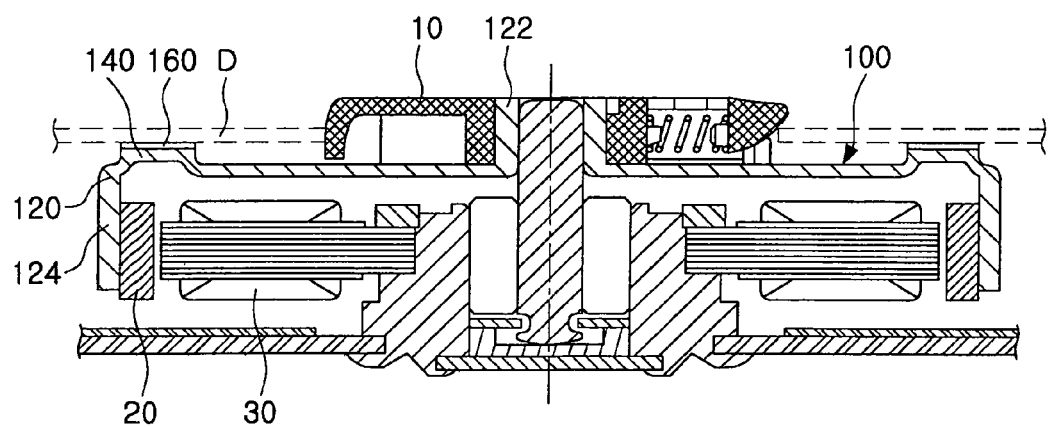
FIG. 2 is a cross-sectional view showing the turntable for a motor according to the exemplary embodiment of the present invention.
Figure 3:
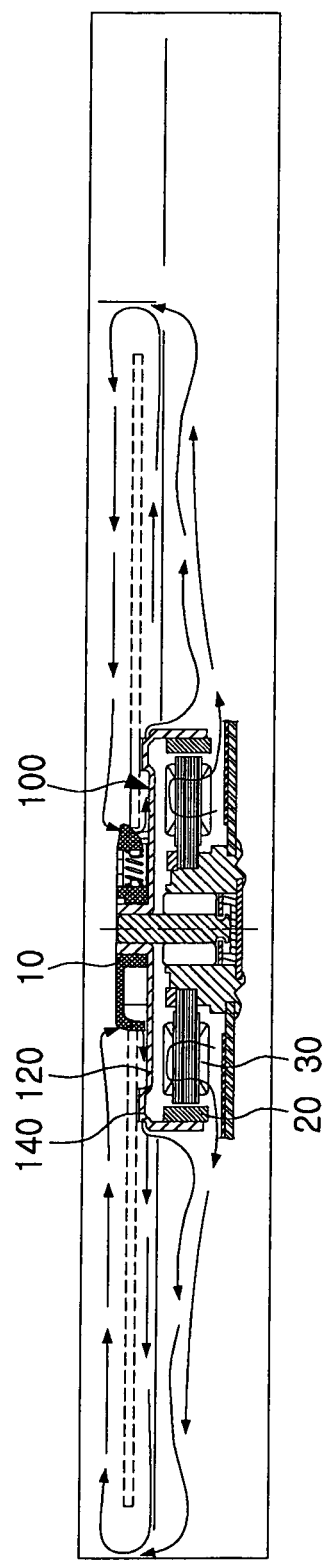
FIG. 3 is a diagram for explaining an air flow formed by the turntable for a motor according to the exemplary embodiment of the present invention.

FIG. 1 is a perspective view showing a turntable for a motor according to an exemplary embodiment of the present invention, FIG. 2 is a cross-sectional view showing the turntable for a motor according to the exemplary embodiment of the present invention, and FIG. 3 is a diagram for explaining an air flow formed by the turntable for a motor according to the exemplary embodiment of the present invention.

Referring to FIGS. 1 and 3, a turntable 100 for a motor according to an exemplary embodiment of the present invention maybe configured to include a rotor case 120, disk holding base parts 140, and disk holding friction parts 160.

The rotor case 120 is mounted with a chucking mechanism 10 mounting a disk D. In other words, the rotor case 120 may include a rotor hub 122 that is formed to extend from the top surface to the top side and has the chucking mechanism 10 mounted to be press-fitted therein.

Meanwhile, the rotor case 120 may include a magnet coupling part 124 having an annular ring magnet 20 mounted in the inner peripheral surface thereof. The magnet 20 is a permanent magnet generating a predetermined strength of magnetic force by having an N pole and an S pole alternately magnetized in a circumferential direction and the rotor case 120 is rotated by electromagnetic interaction between the magnet 20 and a winding coil 30.

Therefore, the disk D mounted on the chucking mechanism 10 may be rotated.

In addition, the rotor case 120 has a cup shape by press machining. To this end, the rotor case 120 may be made of a metal material.

In this case, terms with relation to direction are defined. An axial direction means a vertical direction when being viewed in FIG. 2, a radial direction means an outer end direction based on a center of a rotor case 120 or a central direction based on the outer end of the rotor case 120, and a circumferential direction means a direction rotated along an outer peripheral surface of the rotor case 120.

The disk holding base parts 140 are formed on the rotor case 120 to be protruded by denting and are disposed to be spaced apart from each other in order to form an air passage 50 communicating a space formed between the disk D and the top surface of the rotor case 120 and with the outer side of the rotor case 120.

In other words, the disk holding base parts 140 are formed to be protruded from the top surface of the rotor case 120 by press machining and are disposed to be spaced apart from each other to form the air passage 50.

The disk holding friction part 160 is stacked on the disk holding base part 140 and is grounded with the bottom surface of the disk D. In other words, the disk holding friction part 160 is stacked on the top surface of the disk holding base part 140 so that it may contact the bottom surface of the disk D when the disk D is mounted on the chucking mechanism 10.

Meanwhile, the disk holding friction part 160 may be made of a mixture of at least one of rubber particles and silicon particles and an adhesive. The mixture of at least one of the rubber particles and the silicon particles and the adhesive is applied to the disk holding base part 140 to form the disk holding friction part 160.

Therefore, it may be more easily to form a support part supporting the bottom surface of the disk D and providing friction force.

Describing it in more detail, the support part supporting the bottom surface of the disk D according to the related art is formed by attaching a rubber or silicon sheet to the top surface of the rotor case 120. When the air passage 50 is formed, the rubber or silicon sheet is divided in plural and each of the plurality of divided rubber or silicon sheets is attached to the top surface of the rotor case 120.

Therefore, a working time required to form the support part supporting the bottom surface of the disk D is long and the workability is also poor, thereby degrading productivity.

However, the present invention forms the disk holding base part 140 to be protruded from the top surface of the rotor case 120 by press machining and applies the mixture of at least one of the rubber particles or the silicon particles and the adhesive to the top surface of the disk holding base part 140 to form the disk holding friction part 160 to reduce the working time and improve the workability, thereby making it possible to improve the productivity.

In addition, when the support part supporting the bottom surface of the disk D is formed by bonding the rubber or silicon sheet, it is possible to prevent a peeling phenomenon of the sheet. That is, the disk holding friction part 160 is formed by applying the mixture of at least one of the rubber particles or the silicon particles and the adhesive, such that it is possible to prevent an end of the rubber or silicon sheet from being peeled by a user at the time of detaching the disk D.

Meanwhile, the air passage 50 is formed by the support part supporting the bottom surface of the disk D configured to include the disk holding base part 140 and the disk holding friction part 160, such that the air introduced into the space between the rotor case 120 and the bottom surface of the disk D from the top portion of the chucking mechanism 10 may flow in the outside of the rotor case 120 through the air passage 50, as shown in FIG. 3.

Therefore, the space between the rotor case 120 and the bottom surface of the disk D and the pressure difference and the temperature difference with the outer side of the rotor case 120 are reduced, thereby making it possible to reduce vibrations, noise, or the like, generated due to the pressure difference and the temperature difference.

Further, the pressure difference and the temperature difference between the space between the rotor case 120 and the bottom surface of the disk D and the outer side of the rotor case 120 can be reduced, thereby making it possible to reduce power consumption.

Hereinafter, a method for producing a turntable for a motor according to an exemplary embodiment of the present invention will be described with reference to FIG. 4.

Figure 4:
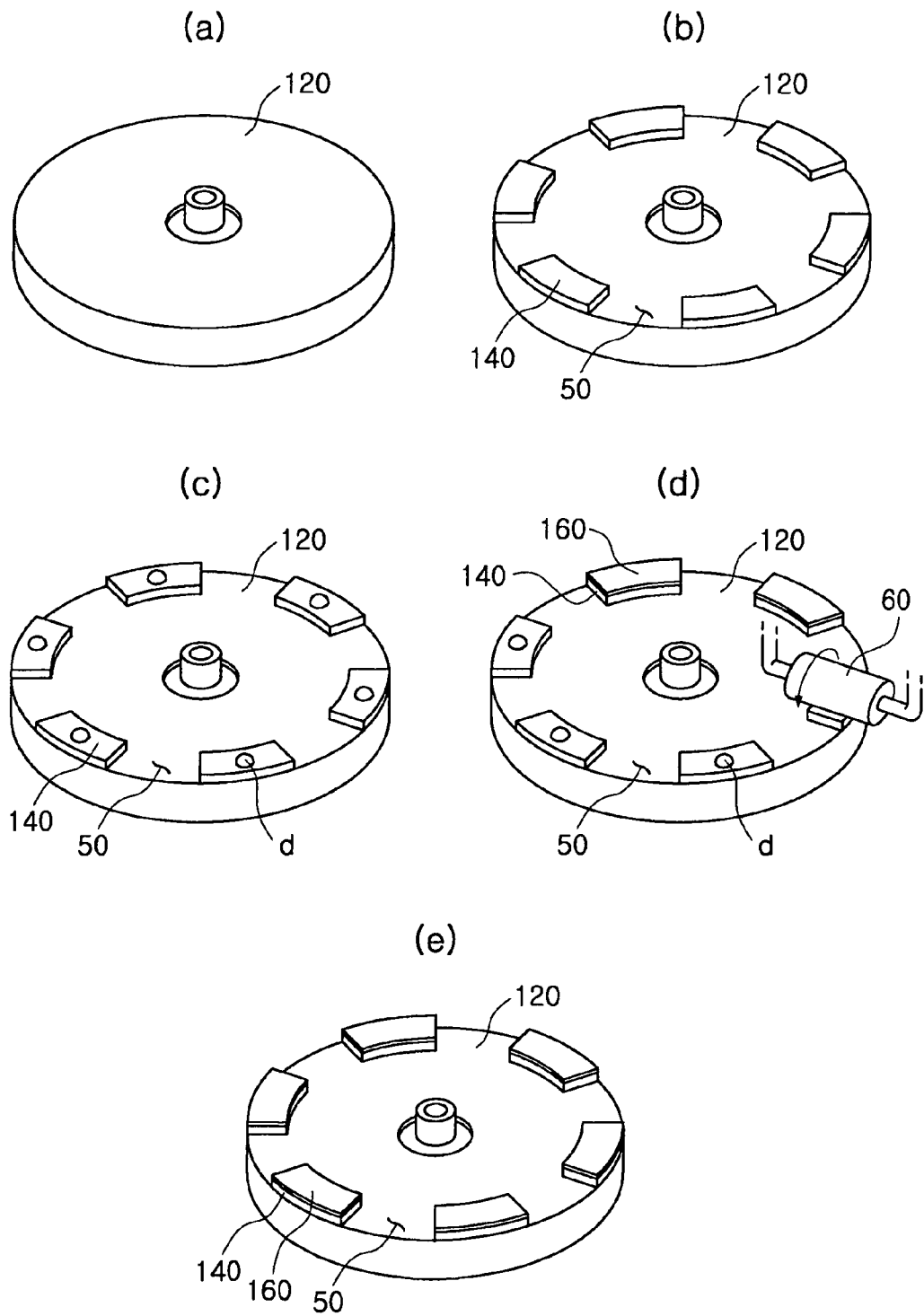
FIG. 4 is a process flow chart showing a method for producing a turntable for a motor according to the exemplary embodiment of the present invention.

FIG. 4 is a process flow chart showing a method for producing a turntable for a motor according to the exemplary embodiment of the present invention.

Referring to FIG. 4, the cup-shaped rotor case 120 made of a metal material is first prepared.

Thereafter, the top surface of the rotor case 120 is provided with the disk holding base part 140 through the press machining. In this case, the plurality of disk holding base parts 140 are disposed at an edge of the top surface of the rotor case 120 to be spaced apart from each other along the circumferential direction.

Therefore, the rotor case 120 is provided with the air passage 50.

Thereafter, a predetermined amount of mixture of at least one of the rubber particles or the silicon particles and the adhesive drops on the top surface of the disk holding base part 140 in a droplet (d) form.

After the mixture of at least one of the rubber particles or the silicon particles and the adhesive is dropped onto the top surfaces of the disk holding base parts 140, respectively, in the droplet (d) form, the mixture is applied to the disk holding base part 140 through the application roller 60 so as to have a predetermined thickness.

When the application is complete, the rotor case 120 is hardened to form the disk holding friction part 160 in a hardening furnace (not shown) for a predetermined time. In this case, the mixture may be hardened by heat or ultraviolet rays to form the disk holding friction part 160. That is, the formation of the disk holding friction part 160 is completed by thermosetting or ultraviolet hardening.

As described above, the present invention forms the disk holding base part 140 to be protruded from the top surface of the rotor case 120 by press machining and applies the mixture of at least one of the rubber particles or the silicon particles and the adhesive to the top surface of the disk holding base part 140 to form the disk holding friction part 160 to reduce working time and improve workability, thereby making it possible to improve productivity.

In addition, when the support part supporting the bottom surface of the disk D is formed by bonding the rubber or silicon sheet through the turntable 100 for a motor produced by the above-mentioned process, it is possible to prevent the peeling phenomenon of the sheet. That is, the disk holding friction part 160 is formed by applying the mixture of at least one of the rubber particles or the silicon particles and the adhesive, such that it is possible to prevent the end of the rubber or silicon sheet from being peeled by a user at the time of detaching the disk D.

Meanwhile, the disk holding base part 140 is formed to be protruded from the top portion from the rotor case 120 by the press machining, thereby making it possible to variously change the shape of the disk holding base part 140. In addition, the disk holding friction part 160 is formed by applying the mixture of at least one of the rubber particles or the silicon particles and the adhesive, such that the disk holding friction part 160 can be easily formed even when the shape of the disk holding base part 140 is changed.

Hereinafter, a method for producing a turntable for a motor according to another exemplary embodiment of the present invention will be described with reference to FIG. 5.

Figure 5:
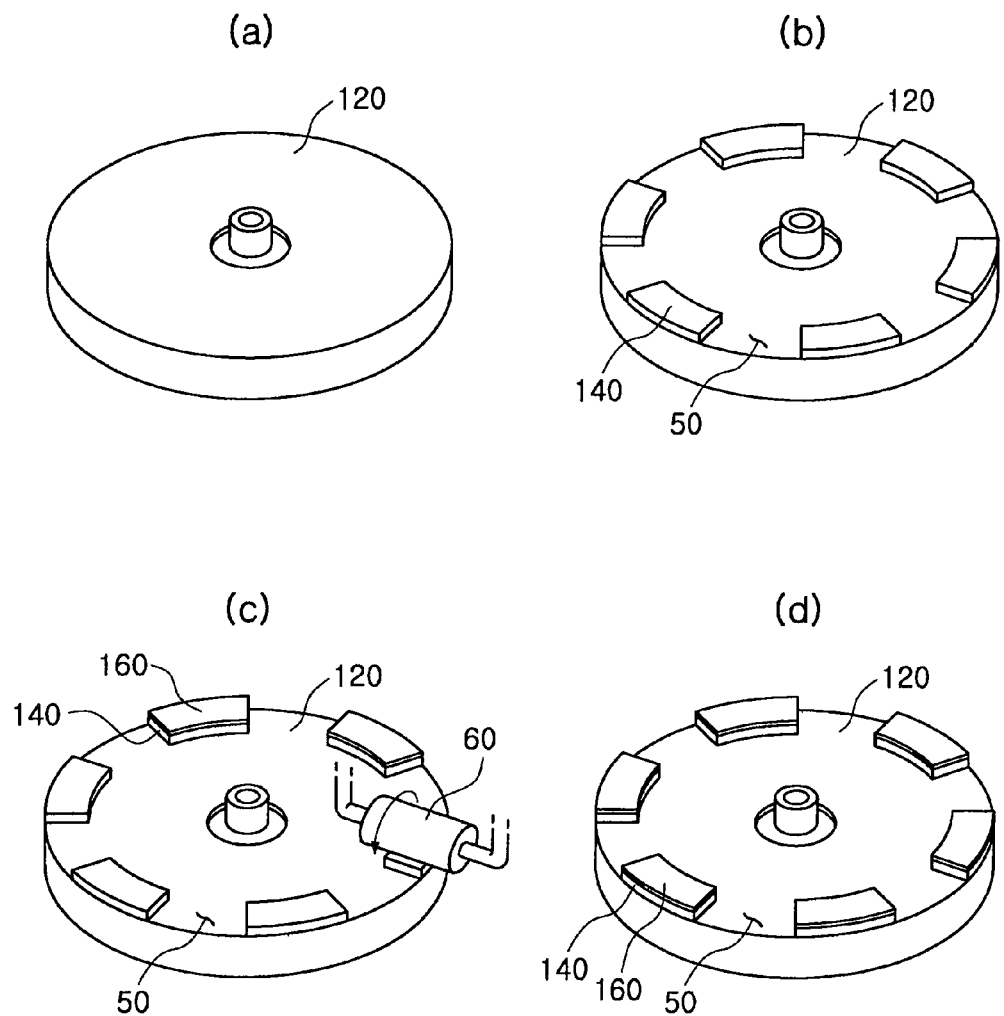
FIG. 5 is a process flow chart showing the method for producing a turntable for a motor according to another exemplary embodiment of the present invention.

FIG. 5 is a process flow chart showing the method for producing a turntable for a motor according to another exemplary embodiment of the present invention.

Referring to FIG. 5, the cup-shaped rotor case 120 made of a metal material is first prepared.

Thereafter, the top surface of the rotor case 120 is provided with the disk holding base part 140 through the press machining. In this case, the plurality of disk holding base parts 140 are disposed at an edge of the top surface of the rotor case 120 to be spaced apart from each other along the circumferential direction. Therefore, the rotor case 120 is provided with the air passage 50.

Thereafter, the application roller 60 that is dipped in the mixture of at least one of the rubber particles or the silicon particles and the adhesive and is smeared with the mixture applies the mixture to the top surfaces of each of the disk holding base parts 140 so as to have a predetermined thickness.

When the application is complete, the rotor case 120 is hardened to form the disk holding friction part 160 in a hardening furnace (not shown) for a predetermined time. In this case, the mixture may be hardened by heat or ultraviolet rays to form the disk holding friction part 160. That is, the formation of the disk holding friction part 160 is completed by thermosetting or ultraviolet hardening.

As described above, the present invention forms the disk holding base part 140 to be protruded from the top surface of the rotor case 120 by press machining and applies the mixture of at least one of the rubber particles or the silicon particles and the adhesive to the top surface of the disk holding base part 140 to form the disk holding friction part 160 to reduce the working time and improve the workability, thereby making it possible to improve the productivity.

In addition, when the support part supporting the bottom surface of the disk D is formed by bonding the rubber or silicon sheet through the turntable 100 for a motor produced by the above-mentioned process, it is possible to prevent the peeling phenomenon of the sheet. That is, the disk holding friction part 160 is formed by applying the mixture of at least one of the rubber particles or the silicon particles and the adhesive, such that it is possible to prevent the end of the rubber or silicon sheet from being peeled by a user at the time of detaching the disk D.

Meanwhile, the disk holding base part 140 is formed to be protruded to the top portion from the rotor case 120 by the press machining, thereby making it possible to variously change the shape of the disk holding base part 140. In addition, the disk holding friction part 160 is formed by applying the mixture of at least one of the rubber particles or the silicon particles and the adhesive, such that the disk holding friction part 160 can be easily formed even when the shape of the disk holding base part 140 is changed.

As set forth above, the present invention applies a mixture of at least one of the rubber particles and the silicon particles and an adhesive to the disk holding base part to form the disk holding friction part, thereby making it possible to prevent the disk holding friction part from being lifted and peeled.

Further, the present invention applies a mixture of at least one of the rubber particles and the silicon particles to the disk holding base part and an adhesive to the disk holding base part to form the disk holding friction portion, thereby making it possible to facilitate the work of forming the disk holding friction part on the plurality of divided disk holding base parts, i.e., to improve the workability.

While the present invention has been shown and described in connection with the exemplary embodiments, it will be apparent to those skilled in the art that modifications and variations can be made without departing from the spirit and scope of the invention as defined by the appended claims.

What is claimed is:

1. A turntable for a motor, comprising:
    a rotor case equipped with a chucking mechanism mounting a disk;
    a disk holding base part formed on the rotor case to be protruded by denting and disposed to be spaced apart from each other in order to form an air passage communicating a space formed between the disk and the top surface of the rotor case with the outer side of the rotor case; and
    a disk holding friction part, made of a mixture of an adhesive and at least one of rubber particles or silicon particles, applied to the disk holding base part so as to be stacked on the disk holding base part, and grounded to the bottom surface of the disk.

2. The turntable for a motor of claim 1, wherein the rotor case is made of a metal material to be molded by press machining.

* * * * *